US011550374B2

(12) United States Patent
Belvant More et al.

(10) Patent No.: US 11,550,374 B2
(45) Date of Patent: Jan. 10, 2023

(54) DEVICE TEMPERATURE CONTROL BASED ON A THRESHOLD OPERATING TEMPERATURE DETERMINED FOR THE DEVICE BASED ON A WEATHER DATA, A DEVICE MODEL, AND A MAPPING TABLE

(71) Applicant: Hewlett-Packard Development Company, L.P., Spring, TX (US)

(72) Inventors: Dipak Belvant More, Pune (IN); Abhishek Ashokkumar Jangid, Pune (IN); Narendra Kumar Chincholikar, Pune (IN); Ravindra Ramtekkar, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 61 days.

(21) Appl. No.: 17/202,741

(22) Filed: Mar. 16, 2021

(65) Prior Publication Data

US 2021/0294399 A1 Sep. 23, 2021

(30) Foreign Application Priority Data

Mar. 17, 2020 (IN) .............................. 202021011531

(51) Int. Cl.
*G06F 1/20* (2006.01)
*G05B 13/02* (2006.01)
(52) U.S. Cl.
CPC ........... *G06F 1/206* (2013.01); *G05B 13/026* (2013.01); *G05B 13/0265* (2013.01)

(58) Field of Classification Search
CPC ........................................................ G06F 1/206
See application file for complete search history.

(56) References Cited

U.S. PATENT DOCUMENTS

| 6,817,199 B2 | 11/2004 | Patel et al. |
| 7,708,056 B2 * | 5/2010 | Shen ....................... G06F 1/206 |
| | | 417/32 |
| 8,031,466 B2 | 10/2011 | Katoh et al. |
| 9,727,346 B2 | 8/2017 | Shao |

(Continued)

FOREIGN PATENT DOCUMENTS

| CN | 103513732 A | 1/2014 |
| CN | 109765946 A | 5/2019 |

(Continued)

*Primary Examiner* — Suresh Suryawanshi
(74) *Attorney, Agent, or Firm* — Quarles & Brady LLP

(57) ABSTRACT

A device with automated device temperature control is described. In one example, the device includes a processor and a weather forecast engine coupled to the processor. The weather forecast engine obtains weather data of a geographical location in which the device is located. The weather data includes values of environmental parameters. The weather data is then shared with a prediction engine. The device further includes a control engine coupled to the processor. The control engine receives a first threshold operating temperature determined for the device based on the weather data, a device model, and a mapping table from the prediction engine. The control engine then initiates a temperature control device, connected to the device, to cool the device if a current device temperature of the device is greater than the first threshold operating temperature.

15 Claims, 6 Drawing Sheets

(56) References Cited

U.S. PATENT DOCUMENTS

| | | |
|---|---|---|
| 2007/0231119 A1* | 10/2007 | Shen .................... F04D 27/004 |
| | | 165/247 |
| 2009/0155045 A1 | 6/2009 | Chang et al. |
| 2011/0015802 A1 | 1/2011 | Imes |
| 2014/0240031 A1 | 8/2014 | Vadakkanmaruveedu et al. |
| 2015/0380785 A1 | 12/2015 | Takeuchi et al. |
| 2016/0162297 A1* | 6/2016 | Shao ...................... G06F 1/206 |
| | | 713/2 |
| 2020/0174424 A1* | 6/2020 | Nagata ................. G03G 21/206 |
| 2021/0227636 A1* | 7/2021 | Embleton ............ H05B 1/0294 |
| 2022/0095692 A1* | 3/2022 | Ferrie .................... A24F 40/57 |

FOREIGN PATENT DOCUMENTS

| | | |
|---|---|---|
| CN | 106427477 B | 6/2019 |
| DE | 112014000761 T5 | 10/2015 |
| JP | 2015-026996 A | 2/2015 |
| JP | 6268122 B2 | 1/2018 |
| WO | 2013/151903 A1 | 10/2013 |

* cited by examiner

DEVICE TEMPERATURE CONTROL BASED ON A THRESHOLD OPERATING TEMPERATURE DETERMINED FOR THE DEVICE BASED ON A WEATHER DATA, A DEVICE MODEL, AND A MAPPING TABLE

BACKGROUND

Electronic devices, such as laptops, computer systems, mobile phones, routers, servers, Automated Teller Machines (ATM), televisions, and display devices include numerous components that produce heat when performing intended functionalities. The heat thus generated may interfere with functioning of the components and the electronic device. For instance, overheating of the components may degrade the working and health of the components and may eventually damage the electronic device.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
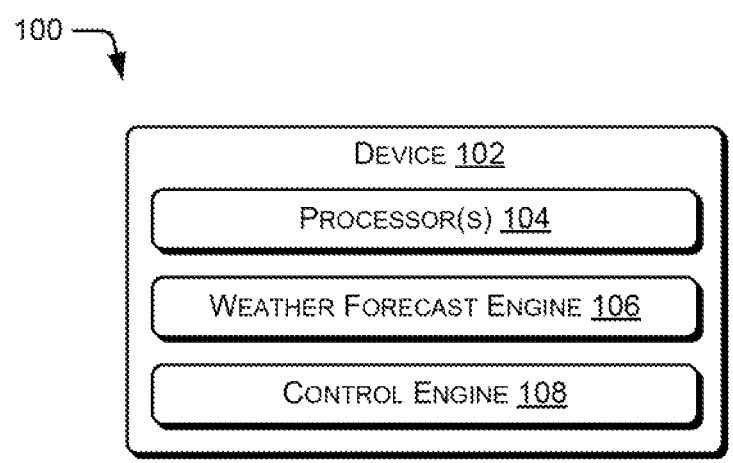
FIG. 1 illustrates a device with automated device temperature control, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices, such as laptops, computer systems, mobile phones, routers, servers, Automated Teller Machines (ATM), televisions, and display devices include numerous components that produce heat during operation. The amount of heat generated may depend on various factors, such as number of operations being performed by the electronic device and number of components operating at the same time. The heat thus generated may increase an operating temperature of the electronic device and may interfere with functioning of the components and the electronic device. If the operating temperature of the electronic device exceeds a threshold operating temperature, the electronic device may not function correctly, thereby, degrading the overall performance of the electronic device. Further, overheating of the components may degrade the health and lifecycle of the components and thereby of the electronic device. For instance, overheating may cause irreparable damage to the electronic device and the components.

Further, the components of the electronic devices may also get damaged or malfunction under cold weather conditions. For example, Lithium-ion batteries found in many electronic devices may get damaged when charged at temperatures below 0° C. (32° F.). Further, hard drives are also susceptible to issues when they are cold, as the lubricants that keep the platters spinning freely may thicken when chilled owing to which the platters may not spin. In some scenarios, the electronic device may not boot due to the issues with the hard drives. In another example, in case of electronic devices that have Liquid Crystal Display (LCD) screens, the electronic devices may malfunction as the LCD screens contain fluid that may freeze at extreme cold temperatures.

Some electronic devices, such as laptops, have internal cooling systems that attempt to reduce increase in temperature. For instance, the electronic devices may include fans to manage heat dissipation of the electronic the components inside the electronic device. However, the internal cooling systems may not be very effective when a large amount of heat is generated. The internal cooling system may thus not be adequate to provide sufficient cooling to reduce the operating temperature of the device. Further, the internal cooling systems may not provide heating in case of cold weather conditions.

External temperature control devices, such as heat pumps, heat sinks, and larger fans have been developed to provide additional cooling or heating to the electronic devices. However, the external temperature control devices have to be manually controlled by a user based on the user's perception of whether the device is generating an excessive amount of heat. Such manual control may not always be accurate and may result in damaging the electronic device. For instance, the user may not be able to determine accurately when to manually turn on an external temperature control device or may forget to turn on the external temperature control device owing to which the electronic device may get damaged.

The present subject matter relates to controlling temperature of electronic devices within a predefined temperature range using a machine learning model. In one example, a temperature control device connected to an electronic device may be controlled based on weather conditions of a geographical location where the electronic device is currently located and a current device temperature of the electronic device. The electronic device is hereinafter interchangeably referred to as a device. In one example, a threshold operating temperature range for the device may be determined based on weather data indicating environmental parameters of the geographical location in which the device is located, a device model of the device, and a mapping table. The threshold operating temperature range may indicate an operating temperature range within which the device may operate without malfunctioning and damaging of the components therein.

In one example, the threshold operating temperature range may be defined between a first threshold operating temperature and a second threshold operating temperature. If the current device temperature is greater than the first threshold operating temperature, the temperature control device connected to the device may be initiated to cool the device and thus, reduce the current device temperature. If the current device temperature of the device is less than the second threshold operating temperature, the temperature control device may be initiated to heat the device and thus increase the current device temperature.

The mapping table may include a mapping between the device model, the weather data, and corresponding operating temperature ranges for the device model. The operating temperature ranges for the device model may indicate the temperature ranges within which the device may operate without malfunctioning or damaging of the components when operated under different weather conditions. Therefore, the mapping table may indicate the threshold operating temperature range for device models for specific weather data.

In one example, during a training phase of the machine learning model, historic weather data for a plurality of geographical locations fora particular time period may be obtained for training the machine learning model. For each of the plurality of geographical locations, historic device data of a plurality of training set devices operating in the geographical location during the particular time period may be obtained. The historic device data may include information about a plurality of device models of a plurality of training set devices, a list of components of the training set devices, current operating temperatures of each component of the training set device and an operating temperature rating of each component of the training set device. The historic weather data and the historic device data may then be used to train and test a plurality of machine learning models. In one example, a cross validation of the machine learning models may be performed to validate the stability of the machine learning models. The stability of the machine learning model may be checked to ensure that the machine learning models efficiently interpret data patterns in the weather data and the device data and minimize noise and variance for accurate predictions.

In one example, the machine learning model may be selected, from the plurality of machine learning models, based on accuracy and precision of the machine learning models in predicting test threshold operating temperatures during training and testing of the machine learning models. Therefore, based on the historic weather data and the historic device data, the machine learning model may be trained to predict the threshold operating temperature range for devices located in the plurality of geographical locations having varying weather conditions. Further, the historic weather data and the historic device data may be analysed to generate the mapping table.

During operation, in a prediction phase, weather data of a geographical location in which the device is located may be obtained and shared with a prediction engine to predict a threshold operating temperature range for the device. The weather data may include values of environmental parameters, for example, temperature, wind speed, humidity, contamination in the ambient environment, weather conditions and other weather-related information. In one example, the prediction engine may be implemented on a centrally located system running the machine learning model. In another example, the prediction engine may be implemented on the device itself. In yet another example, a global prediction engine may be implemented on the system and a local prediction engine may be implemented on the device and be updated from time to time using the global prediction engine. The prediction engine may use the device model of the device, the weather data, and the mapping table to determine the first threshold operating temperature and the second threshold operating temperature defining the operating temperature range for the device.

The first threshold operating temperature and the second threshold operating temperature may then be compared with the current device temperature of the device to determine if the temperature control device may be initiated. As previously described, the temperature control device may be initiated to cool the device, if the current temperature of the device is more than the first threshold operating temperature. If the current device temperature is less than the second threshold operating temperature, the temperature control device may be initiated to heat the device.

The present subject matter thus provides an automated temperature control mechanism for controlling the current device temperature based on various factors, for example, weather conditions, device model and the current device temperature. The temperature control mechanism automatically adapts according to the geographical location, weather data and the device model. Therefore, a device working in hot or cold weather conditions may be provided with sufficient cooling or heating based on the weather conditions without manual input. Providing automatic control of the temperature control device by the device facilitates in ensuring timely switching ON and OFF of the temperature control device for cooling or heating the device, thereby, preventing damage to the device due to overheating or freezing. Further, by automatically controlling the temperature control device, chances of error that may occur due to misjudgement of a user are minimized.

Further, testing the plurality of machine learning models helps in identifying an accurate and efficient machine learning model that is able to correctly predict the threshold operating temperature range for the various types of device and the plurality of device models of each of the various types of device. Further, cross-validating the machine learning models helps in ensuring that the machine learning models are correctly determining the threshold operating temperature ranges.

The present subject matter is further described with reference to FIGS. 1 to 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a device 102 with automated device temperature control, according to an example implementation of the present subject matter. In one example the device 102 may be an electronic device, such as computing devices, networking devices and peripherals, communication devices, display devices, imaging devices, point-of-sale (POS) devices, Automated Teller Machines (ATM), and similar electronic devices. Examples of the device 102 may include, but are not limited to, desktop computers, laptops, mobile phones, tablets, portable computers, workstations, mainframe computers, servers, network servers, routers, modems, ATMs, televisions, display devices, Point of Sale (POS) devices, printers, scanners, multifunction printers, 3D printers, gateways, and electronic meters.

In one example implementation, the device 102 may include a processor(s) 104 and a weather forecast engine 106 coupled to the processor(s) 104 to obtain the weather data of a geographical location in which the device 102 is located. The weather data may include values of environmental parameters, such as temperature, humidity, wind conditions, air pressure, atmospheric particulate matter and salt content. In one example, the weather forecast engine 106 may obtain the weather data from a weather forecast database using the geographical location of the device 102. The weather forecast engine 106 may further share the weather data with a prediction engine (not shown in this figure) for predicting the threshold operating temperature ranges for the device 102.

In one example, the prediction engine may be implemented on a system, such as a server running the machine learning model for predicting the threshold operating temperature ranges. The server may be implemented in a cloud computing environment. In another example, the prediction engine may be implemented on the system and device 102. In said example, a global prediction engine may be implemented on the system and a local prediction engine may be implemented on the device 102. The local prediction engine may be updated from time to time using the global prediction engine. The prediction engine may determine the first threshold operating temperature using the device model of the device, the weather data, and the mapping table. The prediction engine may share the first threshold operating temperature with the device 102.

The device 102 may further include a control engine 108 coupled to the processor(s) 104 to receive the first threshold operating temperature from the prediction engine. Further, the control engine 108 may compare the first threshold operating temperature with the current device temperature of the device 102 to determine if the temperature control device (not shown in this figure) connected to the device 102 may be initiated to control operating temperature of the device 102. In one example, the current device temperature is a current operating temperature of the device 102, which may vary due to heat generated by various components of the device 102.

In one example, if the current device temperature of the device 102 is greater than the first threshold operating temperature, the control engine 108 may initiate the temperature control device to cool the device. Further, the current device temperature may be continually obtained to monitor the current device temperature of the device 102. When the current device temperature of the device 102 becomes less than the first threshold operating temperature, the temperature control device may be stopped. The device 102 may continue monitoring the current device temperature for temperature control.

Figure 2:
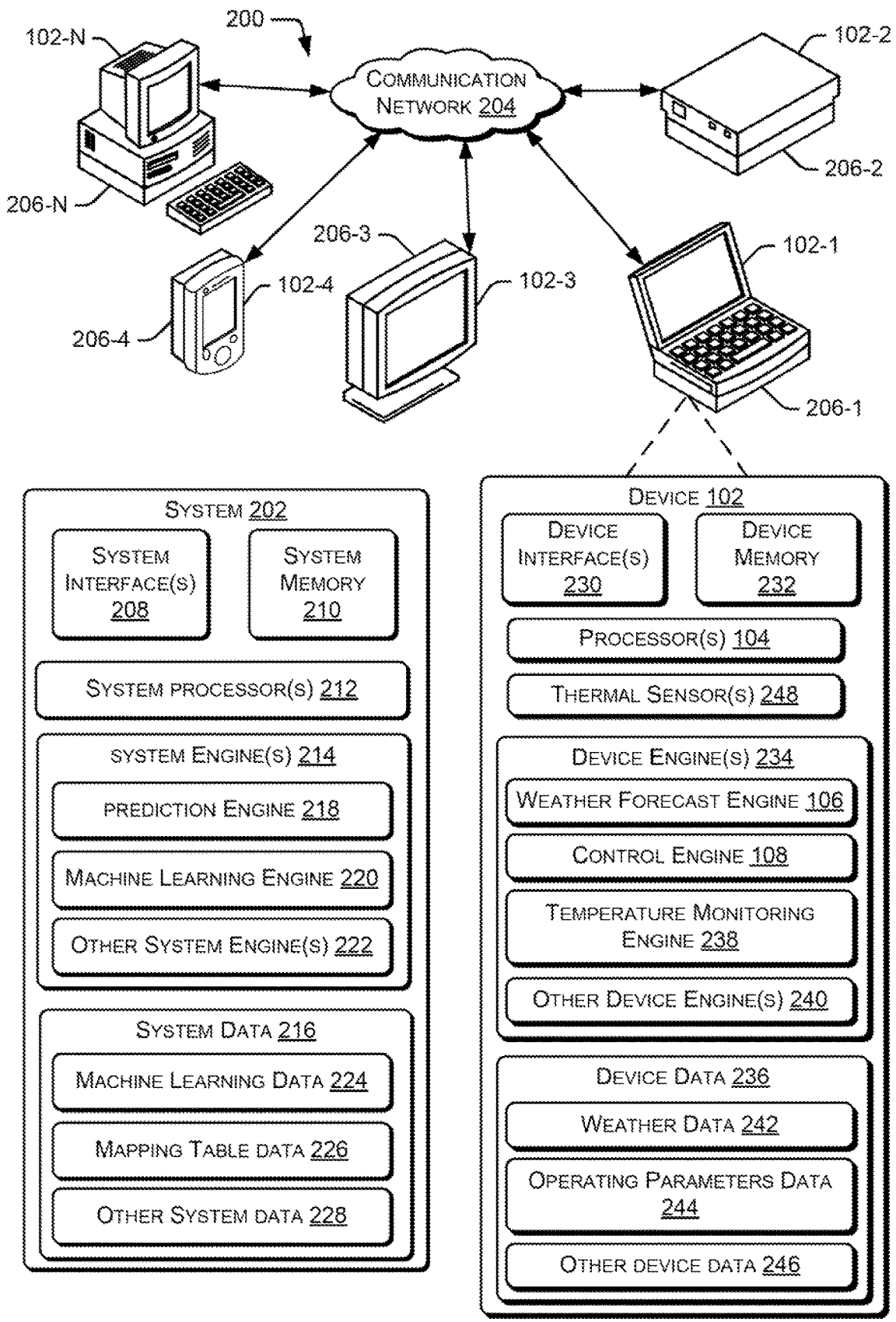
FIG. 2 illustrates a computing environment implementing device temperature control, according to an example implementation of the present subject matter.

FIG. 2 illustrates a computing environment 200 implementing device temperature control, according to an example implementation of the present subject matter. The computing environment 200 may include a system 202 and a plurality of devices 102-1, 102-2, 102-3, 102-4, and 102-N. The plurality of devices 102-1, 102-2, 102-3, 102-4, and 102-N may be individually referred to as device 102 and collectively referred to as devices 102. Examples of the device 102 include, but are not limited to, computing devices, networking devices and peripherals, communication devices, display devices, imaging devices, point-of-sale (POS) devices, Automated Teller Machines (ATM), and similar electronic devices.

Examples of the system 202 include, but are not limited to, desktop computers, workstations, mainframe computers, and network servers. In an example, the system 202 may be implemented as a standalone system. In another example, the system 202 may be implemented as a distributed computing system having one or more physical computing systems geographically distributed at different or same geographical locations.

In one example implementation, the system 202 may be communicatively coupled to the devices 102 over a communication network 204. The communication network 204 may be a wireless network, a wired network, or a combination thereof. The communication network 204 may also be an individual network or a collection of many such individual networks, interconnected with each other and functioning as a single large network, e.g., an Internet or an intranet. The communication network 204 can be one of the different types of networks, such as intranet, local area network (LAN), wide area network (WAN), and the internet. In an example, the communication network 204 may include any communication network that uses any of the commonly used protocols, for example, Hypertext Transfer Protocol (HTTP), and Transmission Control Protocol/Internet Protocol (TCP/IP).

Further, each of the plurality of devices 102 may be connected with corresponding temperature control devices 206-1, 206-2, 206-3, 206-4, 206-N to control the operating temperature of the corresponding device 102. For example, the temperature control device 206-1 may be connected to the device 102-1 to control the operating temperature of the device 102. The temperature control devices 206-1, 206-2, 206-3, 206-4, 206-N may be individually referred to as temperature control device 206 and collectively referred to as temperature control devices 206. In one example, the temperature control device 206 may cool the device 102 to reduce the operating temperature of the device 102 to prevent overheating of the device 102. In another example, the temperature control device 206 may heat the device 102 to increase the operating temperature of the device 102 to prevent components or parts of components, such as lubricants and fluid from freezing in cold weather conditions.

Example, of the temperature control device 206 include, but are not limited to, Peltier devices, thermo-electric coolers, and compressor cooling based devices. In one example, the temperature control device 206 may include a fan that may be switched ON or OFF to cool or heat the device 102. In another example, the temperature control device 206 may include multiple fans to provide larger and faster cooling or heating effect. To heat the device 102, the Peltier devices may act as heat pumps and the fan(s) may extract heat from ambient air and feed the hot air to the device 102 to heat the device 102. In another example, the temperature control device 206 may include heat sinks to control the temperature of the device 102. In another example, the temperature control device 206 may include a combination of the heat sink(s) and fan(s). In another example, the temperature control device 206 may include a combination of components, such as compressor, evaporator, condenser, expansion valve, and refrigerants.

In one example, the temperature control device 206 may be externally connected to a part of the device 102 that produces a substantial amount of heat. For example, the temperature control device 206 may be connected to a bottom of a laptop to directly cool processing units and other heat generating components of the laptop. In another example, the temperature control device 206 may be connected to a rear side of a television to directly cool processing units and other heat generating components of the television. Further, in one example, the temperature control device 206 may be connected to a power outlet of the device 102 to obtain power during operation of the temperature control device 206. In another example, the temperature control device 206 may be provided with a power source, such as a battery to provide power during operation of the temperature control device 206. In another example, the temperature control device 206 may be connected to an external power source to obtain power during operation of the temperature control device 206. In yet another example, the temperature control device 206 may be integral to the device 102, such as for large electronic devices like ATM machines.

The system 202 includes system interface(s) 208, system memory 210, and system processor(s) 212. The system interface(s) 208 may include a variety of interfaces, for example, interfaces for data input and output devices, referred to as input/output (I/O) devices, storage devices, network devices, and the like. The system interface(s) 208 may facilitate communication between the system 202, the devices 102, and various other devices connected in the computing environment 200. The system interface(s) 208 may also provide a communication pathway for one or more components of the system 202. Examples of such components may include, but are not limited to, input device, such as keyboards and a touch enabled graphical user interface.

The system memory 210 may store one or more computer-readable instructions, which may be fetched and executed to provide machine learning models. The system memory 210 may include any non-transitory computer-readable medium including, for example, volatile memory such as Random Access Memory (RAM), or non-volatile memory such as Erasable Programmable Read-only Memory (EPROM), flash memory, and the like.

The system processor(s) 212 may include microprocessors, microcomputers, microcontrollers, digital signal processors, central processing units, state machines, logic circuitries, and/or any other devices that manipulate signals and data based on computer-readable instructions. The system 202 further includes system engine(s) 214 and system data 216.

The system engine(s) 214 may be implemented as a combination of hardware and programming (for example, programmable instructions) to implement one or more functionalities of the system engine(s) 214. In examples described herein, such combinations of hardware and programming may be implemented in several different ways. For example, the programming for the system engine(s) 214 may include processor executable instructions stored on a non-transitory machine-readable storage medium and the hardware for the system engine(s) 214 may include a processing resource to execute such instructions. In one example, the system engine(s) 214 may further be coupled to the system processor(s) 212 of the system 202 to execute the functionalities of the system engine(s) 214.

In the present examples, the machine-readable storage medium may store instructions that, when executed by the processing resource, may implement system engine(s) 214. In such examples, the system 202 may include the machine-readable storage medium storing the instructions and the processing resource to execute the instructions, or the machine-readable storage medium may be separate but accessible to the system 202 and the processing resource. In other examples, the system engine(s) 214 may be implemented by electronic circuitry. The system engine(s) 214 may further include circuitry and hardware for monitoring operations.

The system data 216 may include data that is either stored or generated as a result of functionalities implemented by any of the system engine(s) 214. The system engine(s) 214 of the system 202 may include a prediction engine 218, a machine learning engine 220, and other system engine(s) 222. The other system engine(s) 222 may implement functionalities that supplement applications or functions performed by the system engine(s) 214. Further, the system data 216 may include machine learning data 224, mapping table data 226, and other system data 228.

Further, each of the device 102 may include device interface(s), device memory, device processor(s), device engine(s), and device data. However, for the sake of brevity, and not as a limitation, the device interface(s), the device memory, the device processor(s), the device engine(s), and the device data are illustrated in the device 102-1.

The device 102-1 may include device interface(s) 230, device memory 232, and device processors(s), such as the processor(s) 104. The device interface(s) 230 may include a variety of interfaces, for example, interfaces for data input and output devices, referred to as input/output (I/O) devices, storage devices, network devices, and the like. The device interface(s) 230 may facilitate communication between the system 202, the device 102, and various other computing devices connected in a networked environment. The device interface(s) 230 may also provide a communication pathway for one or more components of the device 102. Examples of such components may include, but are not limited to, input device, such as keyboards and a touch enabled graphical user interface.

The device memory 232 may store one or more computer-readable instructions, which may be fetched and executed for automated device temperature control. The device memory 232 may include any non-transitory computer-readable medium including, for example, volatile memory such as RAM, or non-volatile memory such as EPROM, flash memory, and the like. The device 102-1 further includes device engine(s) 234 and device data 236.

The device engine(s) 234 may be implemented as a combination of hardware and programming (for example, programmable instructions) to implement one or more functionalities of the device engine(s) 234. In examples described herein, such combinations of hardware and programming may be implemented in several different ways. For example, the programming for the device engine(s) 234 may include processor executable instructions stored on a non-transitory machine-readable storage medium and the hardware for the device engine(s) 234 may include a processing resource to execute such instructions. In one example, the device engine(s) 234 may further be coupled to the processor(s) 104 of the device 102 to execute the functionalities of the device engine(s) 234. The processor(s) 104 may include microprocessors, microcomputers, microcontrollers, digital signal processors, central processing units (CPU), graphical processing unit (GPU), state machines, logic circuitries, and/or any other devices that manipulate signals and data based on computer-readable instructions.

In the present examples, the machine-readable storage medium may store instructions that, when executed by the processing resource, implement device engine(s) 234. In such examples, the device 102-1 may include the machine-readable storage medium storing the instructions and the processing resource to execute the instructions, or the machine-readable storage medium may be separate but accessible to the device 102-1 and the processing resource. In other examples, device engine(s) 234 may be implemented by electronic circuitry. The device engine(s) 234 may further include circuitry and hardware for monitoring operations. The device data 236 may include data that is either stored or generated as a result of functionalities implemented by any of the device engine(s) 234.

Further the device engine(s) 234 may include a weather forecast engine, a control engine, a temperature monitoring engine, and other device engine(s). The other device engine(s) may implement functionalities that supplement applications or functions performed by the device engine(s) 234. Further, device data 236 may include weather data, device temperature data, and other data. For instance, the device engine(s) 234 of the device 102-1 may include the weather forecast engine 106, the control engine 108, a temperature monitoring engine 238, and other device engine(s) 240. The device data 236 may include weather data 242, operating parameters data 244, and other data 246.

As previously discussed, the temperature control device 206 may be controlled based on weather conditions of a geographical location where the device 102 is currently located and the current device temperature of the device 102. In one example, a machine learning model may be used to determine a threshold operating temperature range for the device 102 based on the weather conditions along with a device model of the device 102 and a mapping table. In one example, the threshold operating temperature range may indicate an operating temperature range within which the device 102 may operate without malfunctioning and damaging of components of the device 102. The temperature control device 206 may thus be initiated to normalize the operating temperature of the device 102 to be between the threshold operating temperature range if the current device temperature of the device 102 is outside the threshold operating temperature range.

In one example, the current device temperature may be a current operating temperature indicating heat generated by various components of the device 102. The current device temperature may be determined based on individual operating parameters of various components of the device 102. In one example, the individual operating parameters may include individual operating temperature of the components of the device 102. The individual operating parameters of various components of the device 102 may further include values of various component parameters, such as CPU utilization, GPU utilization, CPU fan speed, GPU fan speed, and fan speed of other components. Each component of the device 102 may have an individual operating temperature indicating heat generated by the component during operation. An operating temperature of the device 102 may indicate a normalized operating temperature of various components of the device 102. The operating temperature of different models of a device 102, such as a laptop, may thus vary based on types and numbers of components within the device 102. Further, the operating temperature of different devices 102 of the same device model may also vary depending on any customization or modification of components and specifications. In one example, the device 102 may include thermal sensors 248 connected to the components of the device 102 to sense the individual operating temperature of each of the components. Further, the values of various component parameters, such as CPU utilization, GPU utilization, CPU fan speed, GPU fan speed, and fan speed of other components may be obtained from other device data 246. Obtaining the individual operating parameters of various components of the device 102 may help in more accurate determination of the current device temperature. For example, in one scenario, where the CPU of the device 102 may be executing intense operations, obtaining the CPU temperature may help in determining the current device temperature more accurately.

In one example, the threshold operating temperature range may be defined between a first threshold operating temperature and a second threshold operating temperature. If the current device temperature is greater than the first threshold operating temperature, the device 102 may probably overheat. If the current temperature of the device 102 is less than the second threshold operating temperature, components of the device 102 may start freezing. The temperature control device 206 may thus be initiated to normalize the operating temperature of the device 102 to be between the threshold operating temperature range.

In one example, the prediction engine 218 running on the system 202 may use predetermined machine learning models to determine the threshold operating temperature range for the devices 102. In one example implementation, the prediction engine 218 and the machine learning engine 220, running the machine learning model of the system 202, may be initially trained to determine the threshold operating temperature ranges for various devices and the various device models of the devices 102. In one example, the system 202 may be trained based on historic weather data of a plurality of geographical locations and historic device data of a plurality of training set devices operating in the geographical location. The historic device data of a training set device may include a device model of the training set device, a list of components of the training set device, current operating temperatures of each component of the training set device, and an operating temperature rating of each component of the training set device. The historic weather data of a geographical location may include values of environmental parameters of the geographical location. Examples of the environmental parameters include, but are not limited to, temperature, humidity, wind conditions, air pressure, atmospheric particulate matter, and salt content.

To train the system 202 for predicting the threshold operating temperature ranges of a particular device type, such as a laptop or a router, the machine learning engine 220 may initially obtain historic device data of training set devices of multiple device models of the particular device type. For example, to train the system 202 for predicting the threshold operating temperature ranges for a laptop, the machine learning engine 220 may obtain historic device data of multiple training set devices of different device models of laptops currently available in market and used by users. In another example, to train the system 202 for predicting the threshold operating temperature ranges for a router, the machine learning engine 220 may obtain historic device data of multiple training set devices of different device models of routers currently available in market and used by users.

In one example, the machine learning engine 220 may obtain the historic device data of multiple devices, of different device models, operating in various geographical locations. For instance, the machine learning engine 220 may obtain the historic device data of multiple routers operating in multiple geographical locations. In one example, the historic device data of a geographical location may be obtained such that if routers of different device models are operating in the geographical location, the historic device data of at least one router of each device model is obtained from the geographical location.

The machine learning engine 220 may further obtain the historic weather data of each geographical location from where the historic device data has been obtained. In one example, the historic weather data and the historic device data for each of the plurality of geographical locations may be obtained for a particular time period. For example, the machine learning engine 220 may obtain the historic weather data and the historic device data for past one year or five years from various geographical locations.

The machine learning engine 220 may then provide the historic weather data and the historic device data to a plurality of machine learning models for training. In one example, the machine learning engine 220 may divide the historic weather data and the historic device data into a training set of historic weather data and the corresponding historic device data, and a testing set of historic weather data and the corresponding historic device data. The machine learning engine 220 may provide the training set of historic weather data and the historic device data for each device type to different machine learning models. Examples of the machine learning models being trained include, but are not limited to, gaussian process, Lasso Linear Regression, and Multilayer Perceptron. Each of the machine learning models may be trained using the training set of historic weather data and the historic device data for each device type.

Once the machine learning models are trained, the machine learning engine 220 may provide the testing set of historic weather data and historic device data to each of the plurality of machine learning models for predicting test threshold operating temperatures of the training set devices. The machine learning engine 220 may subsequently analyze the test threshold operating temperatures obtained from each machine learning model to determine a machine learning model that may be used in a prediction phase. In one example, a machine learning model may be selected based on accuracy and precision of the test threshold operating temperature generated by the machine learning models. In one example, the accuracy and precision of a machine learning model may be determined by comparing the test threshold operating temperature generated by each machine learning model for a device model with the operating temperature obtained in the historic device data of the testing sample. Further, for each device type, the machine learning engine 220 may determine the test threshold operating temperatures corresponding to the device type to determine the machine learning model that may be used for predicting the threshold operating temperature range for the particular device type.

In one example, a cross validation of the machine learning models may be performed to validate the stability of the machine learning models. The stability of the machine learning model may be checked to ensure that the machine learning model efficiently interpret data patterns in the weather data and the device data and minimize noise and variance for accurate predictions. In one example, K folds cross validation may be used in which sample weather data and the device data may be divided into k subsets and one of the k subsets of the sample weather data and the device data may be used for testing the machine learning models. In one example implementation, the historic weather data and the historic device data may be divided into a plurality of data sets and a data set from the plurality of data sets may be used for testing the machine learning models.

Therefore, based on the historic weather data and the historic device data, the machine learning model may be trained to predict the threshold operating temperature range for the different types of devices 102 located in multiple geographical locations having varying weather conditions. In one example, the historic weather data, the historic device data, and the test threshold operating temperatures may be saved in the machine learning data 224. In one example, the machine learning engine 220 and the machine learning models may be regularly or periodically trained based on updated historic weather data, updated historic device data, and feedback received from the devices 102 during the prediction phase.

Further, the historic weather data and the historic device data may be analysed to generate the mapping table indicating a relation between the weather data of the geographical location, the device model, and operating temperature of the device model. In one example, upon determining the machine learning model for each device type, the prediction engine 218 may generate the mapping table for each device type. The prediction engine 218 may initially analyze the historic weather data to generate a first mapping table, associating different temperature ranges with different weather conditions. The first mapping table may indicate, for example, an ambient temperature that may be observed when a place has strong winds and moderate humidity or when the place has high humidity, low wind and high salt content.

The prediction engine 218 may further analyze the historic device data to generate a second mapping table, associating different device models with components, the current operating temperatures of each component, the operating temperature rating of each component, and the operating temperature of the device. The prediction engine 218 may subsequently analyze and process the first mapping table and the second mapping table to generate the mapping table indicating the relation between the weather data of the geographical location, the device model, and the operating temperature of the device model. In one example, the prediction engine 218 may save the first mapping table, the second mapping table, and the mapping table in the mapping table data 226.

Once the system 202 is trained, the system 202 or a similar system may be implemented for interaction with the devices 102 for predicting the threshold operating temperature ranges for the devices 102 in the prediction phase. In one example, the weather forecast engine 106 of the device 102 may obtain the weather data of the geographical location in which the device 102 is located. In one example, the weather forecast engine 106 may obtain the weather data at a predetermined time every day, such as every morning or at noon. In another example, the weather forecast engine 106 may obtain the weather data whenever the device 102 is switched ON for the first time every day. In another example, the weather forecast engine 106 may obtain the weather data at predetermined time intervals, such as every 6 hours, 10 hours, and 12 hours, 24 hours, from the first use.

To obtain the weather data of the geographical location, the weather forecast engine 106 may initially obtain the geographical location of the device 102. In one example, the weather forecast engine 106 may obtain the geographical location using a global positioning system (GPS) unit of the device 102. In another example, the weather forecast engine 106 may obtain the geographical location over internet, using location search engines. In another example, the weather forecast engine 106 may obtain the geographical location using Internet Protocol (IP) address of the device 102. In another example, the weather forecast engine 106 may obtain the geographical location from a geographical location identifier saved in the device memory 232. For example, for devices with low processing resources and for stationary devices, such as routers or ATM machines, or devices with low processing resources, the geographical location may remain the same and may thus be saved in geographical location identifier. The weather forecast engine 106 may thus obtain the geographical location from the device memory 232 to obtain the weather data.

As previously described, the weather data may include values of environmental parameters, such as temperature, humidity, wind conditions, air pressure, atmospheric particulate matter, and salt content. In one example, the weather forecast engine 106 may obtain the weather data from a weather forecast database maintained by a public or a private organization, such as Meteorological Department, or a weather forecasting service. The weather forecast engine 106 may accordingly update the weather data 242 and share the weather data with the prediction engine 218.

On receiving the weather data, the prediction engine 218 may determine the threshold operating temperature range for the device 102 based on the device model of the device 102, the weather data, and the mapping table. In one example, the prediction engine 218 may determine the first threshold operating temperature and the second threshold operating temperature based on the device model of the device 102, the weather data, and the mapping table to predict the threshold operating temperature range.

In one example, the device model of the device 102 may be provided along with the weather data shared by the prediction engine 218. In another example, the device model may be determined by the prediction engine 218 based on a device ID, such as a serial number of the device 102, an IP address of the device 102, a MAC address of the device 102, an identification number of the device 102 as assigned by the system 202. The device ID may be provided along with the weather data shared by the prediction engine 218. In one example, the prediction engine 218 may use the machine learning model identified by the machine learning engine 220 for predicting the threshold operating temperature range for the device 102 based on the device model, the weather data, and the mapping table.

The prediction engine 218 may subsequently share the first threshold operating temperature and the second threshold operating temperature defining the threshold operating temperature range with the device 102. In one example, the control engine 108 may receive the first threshold operating temperature and the second threshold operating temperature from the prediction engine 218. The control engine 108 may further obtain the current device temperature from the temperature monitoring engine 238.

In one example implementation, the current device temperature may be determined based on the individual operating parameters of various components of the device 102. The individual operating parameters may include individual operating temperature of the components of the device 102. The temperature monitoring engine 238 may initially obtain the individual operating temperature of components from the thermal sensors 248 connected to the components of the device 102. As previously described, the thermal sensors 248 may sense the individual operating temperature of each component of the device 102. The temperature monitoring engine 238 may subsequently calculate the operating temperature of the device 102 based on the individual operating parameters of the components. In one example, the individual operating parameters of various components of the device 102 may further include values of various component parameters, such as CPU utilization, GPU utilization, CPU fan speed, GPU fan speed, and fan speed of other components. In one example, the temperature monitoring engine 238 may analyze the individual operating parameters of device 102 to determine the current device temperature. The temperature monitoring engine 238 may save the operating parameters of the device 102 in the operating parameters data 244 which may be obtained by the control engine 108 as the current device temperature.

The control engine 108 may compare the first threshold operating temperature and the second threshold operating temperature with the current device temperature of the device 102. If the current device temperature is greater than the first threshold operating temperature, the control engine 108 may initiate the temperature control device 206 to cool the device 102. If the current device temperature is less than the first threshold operating temperature, the control engine 108 may compare the current device temperature with the second threshold operating temperature. If the current device temperature is less than the second threshold operating temperature, the control engine 108 may initiate the temperature control device 206 to heat the device 102.

In one example, the control engine 108 may send an initiation request to the device interface(s) 230 to switch ON the temperature control device 206. In another example, the control engine 108 may send an initiation request to the other device engines 240 to switch ON the temperature control device 206. In one example, the control engine 108 may perform the above described device temperature control even when the device 102 is not in use and is, for example, when the device 102 is in sleep or hibernate mode.

Once the temperature control device 206 is initiated, the temperature monitoring engine 238 may continue monitoring the operating temperature of the device 102. In one example, the temperature monitoring engine 238 may continually monitor the operating temperature of the device 102 to obtain an updated current device temperature continually. In another example, the temperature monitoring engine 238 may periodically monitor the operating temperature to obtain the updated current device temperature of the device 102 periodically.

To obtain the updated current device temperature, the temperature monitoring engine 238 may obtain the individual operating temperatures from the thermal sensors 248. The temperature monitoring engine 238 may then analyze the individual operating temperatures to obtain the updated current device temperature. The temperature monitoring engine 238 may further save the updated current device temperature in the operating parameters data 244.

The control engine 108 may obtain the updated current device temperature and compare the updated current device temperature with the first threshold operating temperature and the second threshold operating temperature. The control engine 108 may stop the temperature control device 206 if the updated current device temperature has a value between the first threshold operating temperature and the second threshold operating temperature. For example, the control engine 108 may stop the temperature control device 206 from heating the device 102 if the updated current device temperature is greater than the second threshold operating temperature. The control engine 108 may stop the temperature control device 206 from cooling the device 102 if the updated current device temperature is less than the first threshold operating temperature.

In one example, the control engine 108 may also provide various reports in the form of graphical outputs or visualization charts, such as pie charts, bar charts, graphs, and scatter plots. The reports may indicate variations in the operating temperatures of the device 102 and use statistics of the temperature control device 206. In one example implementation, the reports may indicate an amount of time taken by the temperature control device 206 to bring operating temperatures of the device 102 in the threshold operating temperature range. The control engine 108 may share the reports with the system 202 as feedback and training data for the prediction engine 218 and the machine learning engine 220. The control engine 108 may also share the operating parameters data 244 and the weather data 242 with the system 202 as further training data.

Figure 3:
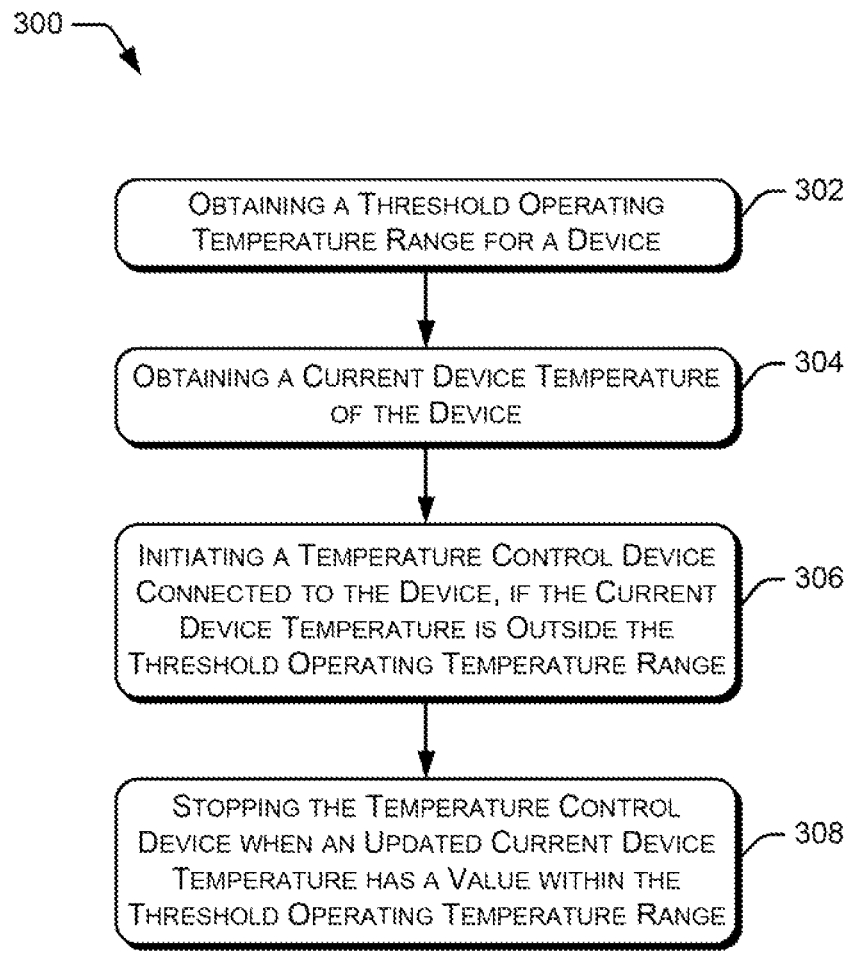
FIG. 3 illustrates a method for device temperature control, according to an example implementation of the present subject matter.
Figure 4:
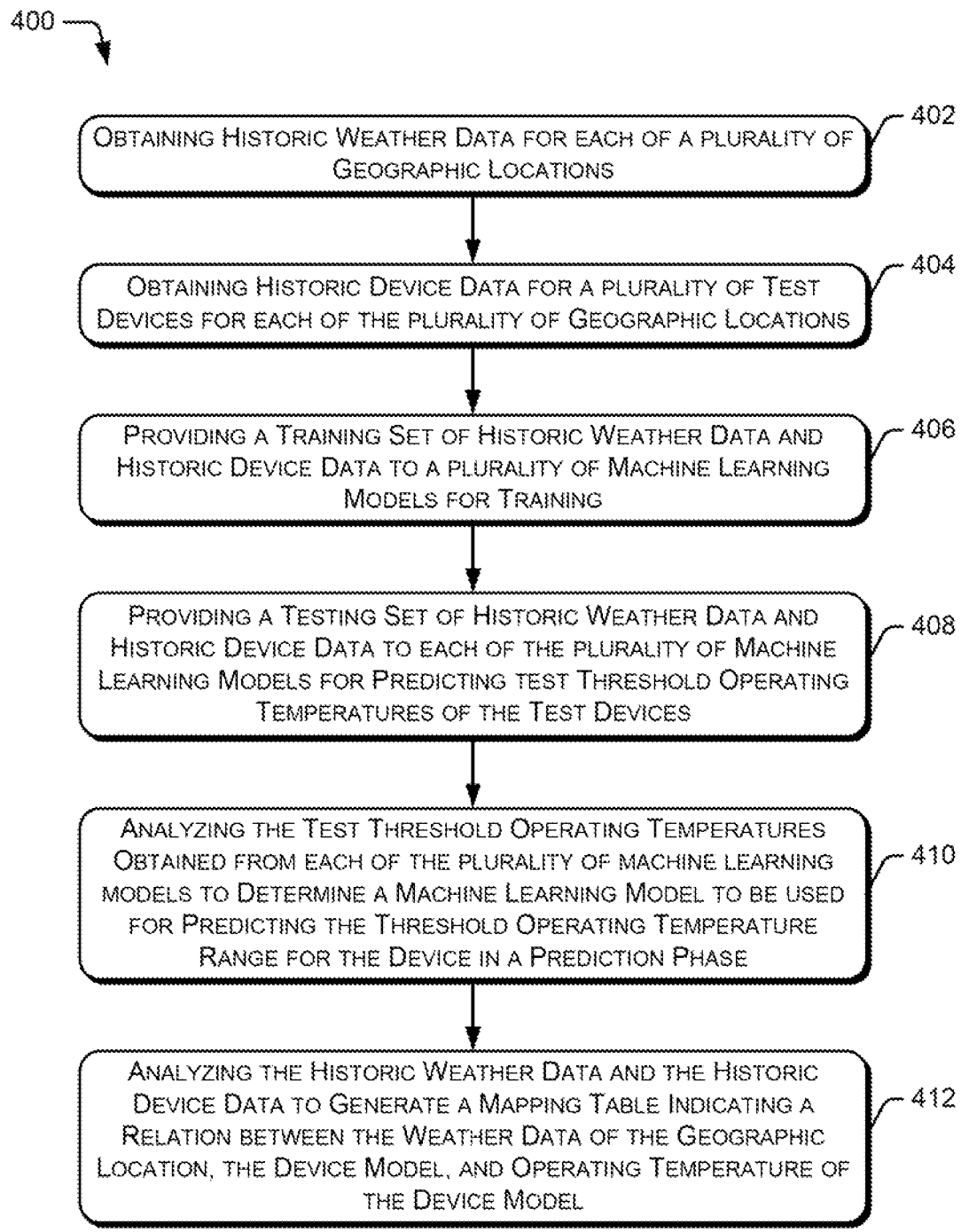
FIG. 4 illustrates a method for training machine learning models for device temperature control, according to another example implementation of the present subject matter.
Figure 5:
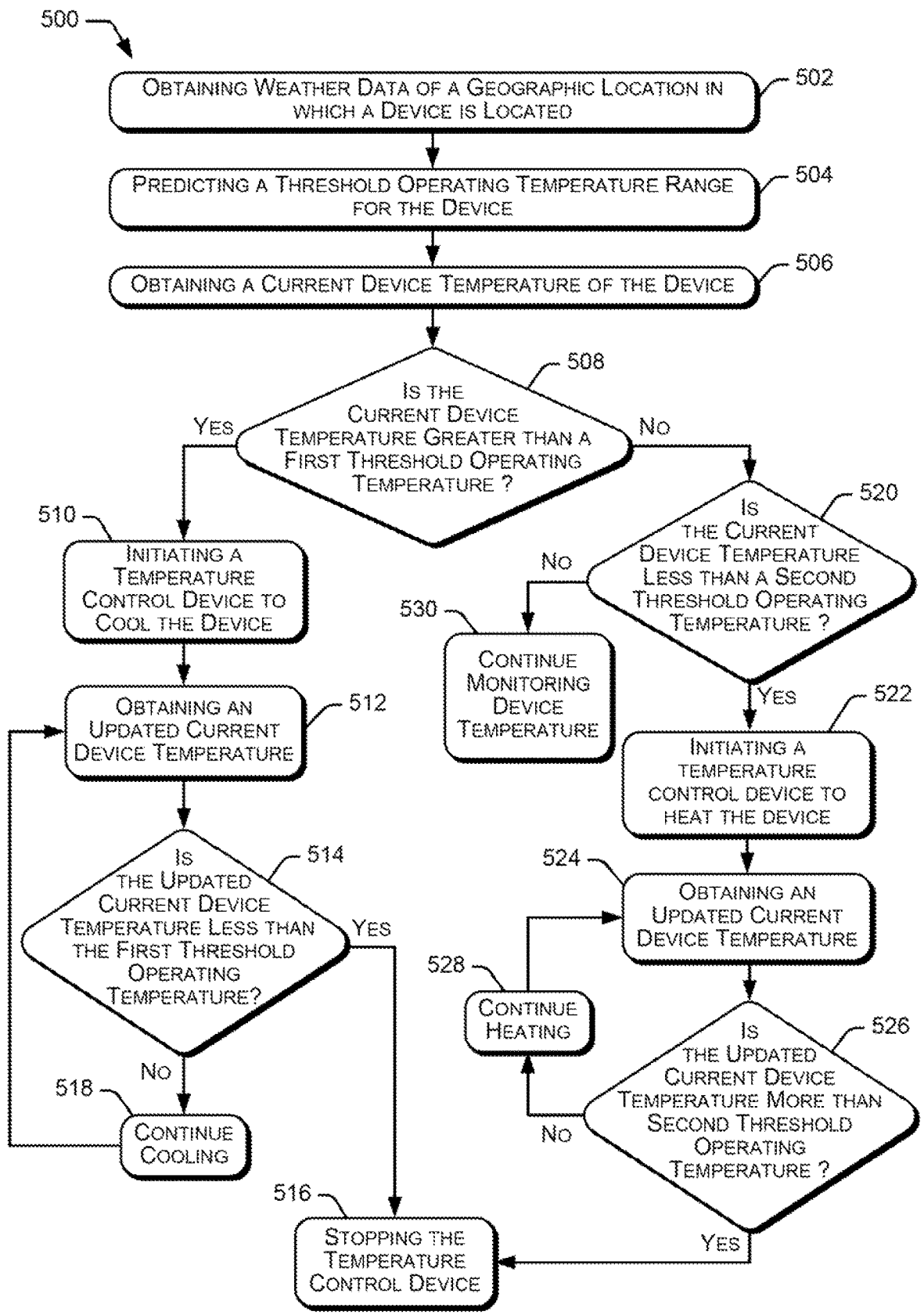
FIG. 5 illustrates a method for device temperature control, according to another example implementation of the present subject matter.

FIGS. 3, 4, and 5 illustrate example methods 300, 400, and 500, for device temperature control. The order in which the methods are described is not intended to be construed as a limitation, and any number of the described method blocks may be combined in any order to implement the methods, or an alternative method. Furthermore, methods 300, 400 and 500 may be implemented by processing resource or computing device(s) through any suitable hardware, non-transitory machine readable instructions, or combination thereof.

It may also be understood that the methods 300, 400, and 500 may be performed by programmed computing devices, such as the system 202, the devices 102 as depicted in FIGS. 1-2, and other similar systems. Furthermore, the methods 300, 400, and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300, 400, and 500 are described below with reference to the system 202 and the devices 102 as described above; other suitable systems for the execution of these methods may also be utilized. Additionally, implementation of these methods is not limited to such examples.

FIG. 3 illustrates a method 300 for device temperature control, according to an example implementation of the present subject matter. At block 302, a threshold operating temperature range may be obtained for a device. In one example, the device may be an electronic device, such as a computing device, a networking device and peripheral, communication device, a display device, an imaging device, a point-of-sale (POS) device, an Automated Teller Machines (ATM) and similar electronic devices. Examples of the device include, but are not limited to, desktop computers, laptops, mobile phones, tablets, portable computers, workstations, mainframe computers, servers, network servers, routers, repeaters, modems, ATM machines, televisions, display devices, POS terminals, printers, scanners, multifunction printers, 3D printers, gateways, electronic meters.

The threshold operating temperature range may be determined based on a device model of the device and weather data of a geographical location in which the device is located, wherein the weather data includes values of environmental parameters. In one example implementation, a weather forecast engine, such as the weather forecast engine 106 of the device 102 may initially obtain the weather data of the geographical location in which the device is located. The weather data may include values of environmental parameters, for example, temperature, wind speed, humidity, contamination in the ambient environment, weather conditions and other weather-related information. The obtained weather data may then be used to predict the threshold operating temperature range for the device. In one example, the threshold operating temperature range may be determined by a prediction engine, such as the prediction engine 218, implemented on a centrally located system. In another example, the prediction engine may be implemented on the device itself. In yet another example, a global prediction engine may be implemented on the system and a local prediction engine may be implemented on the device. In said example, the local prediction engine may be updated from time to time using the global prediction engine. The prediction engine may use a device model of the device, the weather data, and a mapping table to determine the threshold operating temperature range for the device. The device may then receive the determined threshold operating temperature range for the device.

At block 304, a current device temperature of the device may be obtained. In one example implementation, current device temperature of the device may be obtained based on individual operating parameters of a plurality of components of the device. The individual operating parameters may include individual operating temperature of the components of the device 102. In one example, thermal sensors 248 may be connected to components of the device to sense the individual operating temperature of each of the component. The individual operating parameters of various components of the device 102 may further include values of various component parameters, such as CPU utilization, GPU utilization, CPU fan speed, GPU fan speed and fan speed of other components. The individual operating parameters from the thermal sensors may then be used to calculate the current device temperature of the device. A control engine of the device may subsequently obtain the current device temperature. The control engine may further obtain the threshold operating temperature range from the prediction engine.

At block 306, a temperature control device connected to the device is initiated. In one example, the temperature control device is initiated if the current device temperature is outside the threshold operating temperature range. In one example, the threshold operating temperature range may include a first threshold operating temperature and a second threshold operating temperature. The first threshold operating temperature may indicate a temperature below which the device may operate without malfunctioning and damaging the components of the device. The second threshold operating temperature range may indicate a temperature above which the device may function properly without damaging the components of the device. The current device temperature may thus be compared with the first threshold operating temperature and the second threshold operating temperature to determine if the current device temperature is outside the threshold operating temperature range.

If it is determined that the current device temperature is outside the threshold operating temperature range, the temperature control device may be initiated.

At block 308, the temperature control device may be stopped. In one example, the temperature control device may be stopped if an updated current device temperature has a value within the threshold operating temperature range. In one example implementation, subsequent to initiating the temperature control device, an updated current device temperature of the device may be regularly or periodically obtained. If the updated current device temperature is within the threshold operating temperature range, the temperature control device may be stopped.

FIG. 4 illustrates a method 400 for training machine learning models for device temperature control, according to another example implementation of the present subject matter. At block 402, historic weather data for each of a plurality of geographical locations may be obtained. In one example implementation, the historic weather data may indicate past weather-related information, forecasts and other environmental parameters, such as temperature, humidity, wind conditions, air pressure, atmospheric particulate matter, and salt content. The historic weather data may be obtained from plurality of sources, for example, weather forecast databases, weather forecasting web pages, weather service agencies, metrological departments, climate data centers and other similar sources. The historic weather data for the plurality of geographical locations may be obtained for a particular period of time. In one example, the historic weather data may be obtained for previous hours, days, months, year and plurality of years for the plurality of geographical locations.

At block 404, historic device data may be obtained for a plurality of training set devices for each of the plurality of geographical locations. In one example, the training set devices may be the devices 102 as mentioned in FIGS. 1 and 2. In one example implementation, the historic device data may be obtained from the plurality of training set devices operating in the geographical location during the particular period of time. In one example, the historic device data may include a device model of the training set device, a list of components of the training set device, current operating temperatures of each component of the training set device, and an operating temperature rating of each component of the training set device. In one example, the historic device data may be obtained from databases and servers that may store data related to the training set devices. In another example, the historic device data may be obtained from external data providers and service providers that may provide data related to the training set devices. In yet another example, the historic device data may be obtained for manufacturers of the training set devices.

At block 406, a training set of historic weather data and historic device data may be provided to a plurality of machine learning models. In one example implementation, the training set of historic weather data and historic device data may be obtained from the historic device data and the historic weather data previously obtained. The training set of historic weather data and historic device data may be used by the plurality of machine learning models for training. Examples of the machine learning models may include, but not limited to, gaussian process, Lasso Linear Regression, and Multilayer Perceptron.

At block 408, a testing set of historic weather data and historic device data may be provided to each of the plurality of machine learning models. In one example implementation, the test set of historic weather data and historic device data may be obtained from the historic device data and the historic weather data previously obtained and may be different from the training set of historic weather data and historic device data. In one example implementation, once the machine learning models have been trained, the testing set of historic weather data and historic device data may be provided to each of the plurality of machine learning models for predicting test threshold operating temperatures of the training set devices.

At block 410, the test threshold operating temperatures may be analyzed. In one example implementation, a machine learning engine, such as the machine learning engine 220 may analyze the test threshold operating temperatures obtained from each of the machine learning models to determine a machine learning model that may be used in a prediction phase. The machine learning model to be used in the prediction phase may be selected by analyzing the accuracy and precision of the test threshold operating temperature generated by each of the machine learning models. In one example, a machine learning model that generated the most accurate and precise test threshold operating temperature may be selected for use in the prediction phase.

At block 412, the historic weather data and the historic device data may be analysed to generate a mapping table indicating a relation between the weather data of the geographical location, the device model, and operating temperature of the device model. In one example, upon determining the machine learning model for each device type, a prediction engine, such as the prediction engine 218 may generate the mapping table for each device type. The historic weather data may be initially analyzed to generate a first mapping table, associating different temperature ranges with different weather conditions. The first mapping table may indicate, for example, an ambient temperature that may be observed when a place has snowfall and no sunshine or when the place has high humidity, low wind and high salt content.

Further the historic device data may be analyzed to generate a second mapping table, associating different device models with components, the current operating temperatures of each component, the operating temperature rating of each component, and the operating temperature of the device. The first mapping table and the second mapping table may further be processed to generate a mapping table indicating the relation between the weather data of the geographical location, the device model, and the operating temperature of the device model.

FIG. 5 illustrates a method 500 for device temperature control, according to another example implementation of the present subject matter. At block 502, weather data of a geographical location in which a device is located may be obtained. In one example implementation, a weather forecast engine, such as the weather forecast engine 106, of the device may initially obtain the weather data of the geographical location in which the device is located. The weather data may include values of environmental parameters, for example, temperature, wind speed, humidity, contamination in the ambient environment, weather conditions and other weather-related information.

At block 504, a threshold operating temperature range for the device may be predicted. In one example, the threshold operating temperature range may be determined by a prediction engine, such as the prediction engine 218. The prediction engine may use a device model of the device, the weather data, and a mapping table to determine the threshold operating temperature range for the device. The threshold operating temperature range may be defined between a first threshold operating temperature and a second threshold operating temperature.

At block 506, a current device temperature of the device may be obtained. In one example implementation, the current device temperature of the device may be obtained based on individual operating parameters of a plurality of components of the device. The individual operating parameters may include individual operating temperature of the components of the device 102. In one example, thermal sensors may be connected to components of the device to sense the individual operating temperature of each of the component. The individual operating parameters of various components of the device 102 may further include values of various component parameters, such as CPU utilization, GPU utilization, CPU fan speed, GPU fan speed, and fan speed of other components. The individual operating parameters may then be used to calculate the current device temperature of the device.

At block 508, it is determined if the current device temperature of the device is greater than the first threshold operating temperature. In one example implementation, the first threshold operating temperature may be compared with the current device temperature to determine if the current device temperature of the device is greater than the first threshold operating temperature. If it is determined that the current device temperature of the device is greater than the first threshold operating temperature (Yes path), a temperature control device connected to the device may be initiated, at block 510, to cool the device by reducing the current device temperature of the device.

At block 512, an updated current device temperature may be obtained. In one example implementation, the updated current device temperature of the device may be obtained based on updated individual operating temperatures of the plurality of components of the device. In one example implementation, the updated current device temperature of the device may be received periodically. In another example, the updated current device temperature may be continuously obtained.

At block 514, it is determined if the updated current device temperature is less than the first threshold operating temperature. If it is determined that the updated current device temperature is less than the first threshold operating temperature (Yes path), the temperature control device may be stopped, at block 516. If it is determined the updated current device temperature is greater than the first threshold operating temperature (No path), the temperature control device may not be stopped and may be continued to cool the device, at block 518. The device may subsequently continue to obtain the updated current device temperature at block 512.

At block 508, if it is determined that the current device temperature of the device is less than the first threshold operating temperature (No path), it may further be determined if the current device temperature is less than a second threshold operating temperature, at block 520. If it is determined that the current device temperature is greater than the second threshold operating temperature (No path), the current device temperature may be continued to be monitored, at block 532. If it is determined that the current device temperature is less than the second threshold operating temperature (Yes path), the temperature control device may be initiated to heat the device, at block 522.

At block 524, the updated current device temperature may be obtained. In one example implementation, the updated current device temperature of the device may be received periodically. In another example, the updated current device temperature may be continuously obtained.

Figure 6:
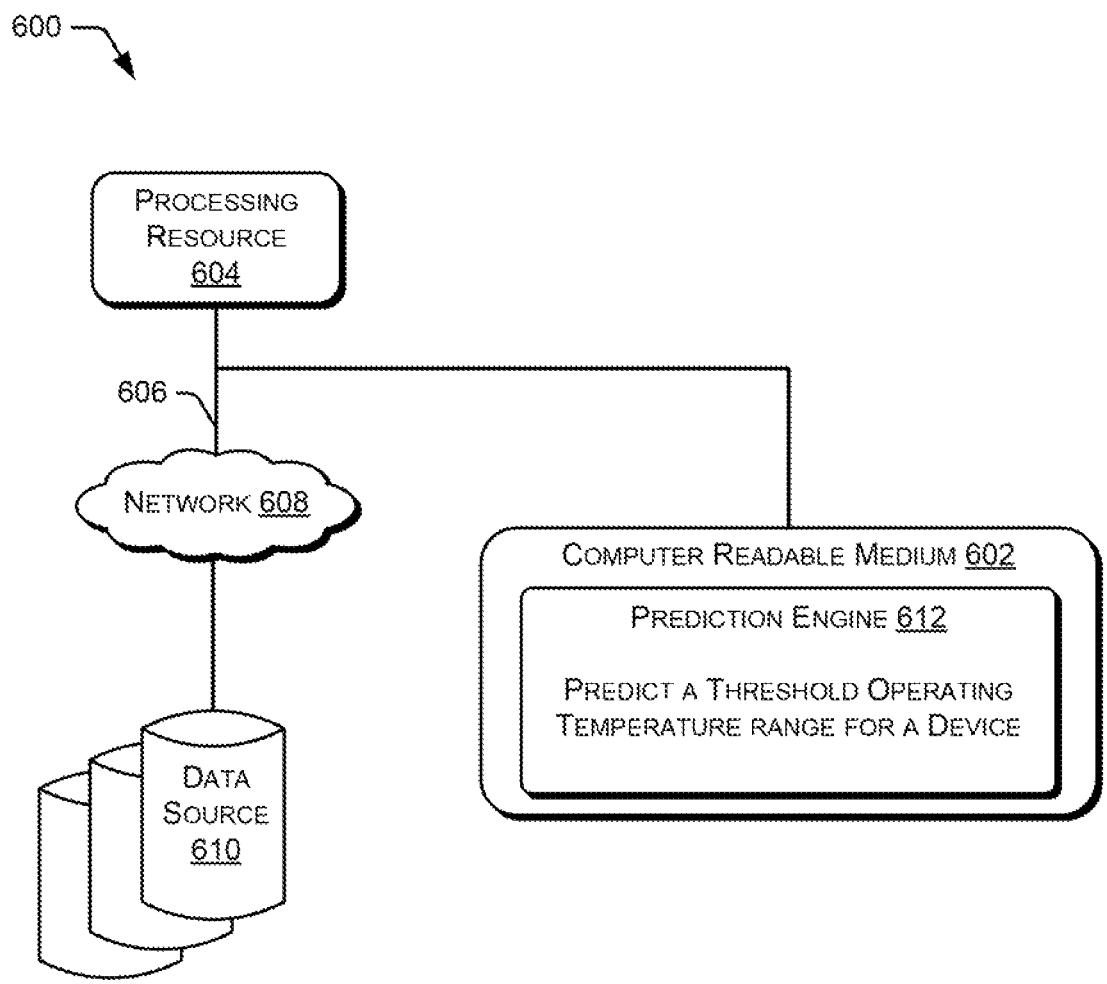
FIG. 6 illustrates a network environment having a non-transitory computer readable medium for device temperature control, according to an example implementation of the present subject matter.

At block 526, it is determined if the updated current device temperature of the device is more than the second threshold operating temperature. If it is determined that the updated current device temperature of the device is more than the second threshold operating temperature (Yes path), the temperature control device may be stopped, at block 516. If it is determined the updated current device temperature is less than the second threshold operating temperature (No path), the temperature control device may not be stopped and may be continued to heat the device, at block 528. The device may subsequently continue to obtain the updated current device temperature FIG. 6 illustrates an example network environment 600 using a non-transitory computer readable medium 602 for device temperature control, according to an example implementation of the present subject matter. The network environment 600 may be public networking environment or a private networking environment. In one example, the network environment 600 may include processing resource 604 communicatively coupled to the non-transitory computer readable medium 602 through a communication link 606.

In an example, the processing resource 604 may be a processor of an electronic device, such as the device 102. The non-transitory computer readable medium 602 may be, for example an internal memory device or an external memory device. In one example, the communication link 606 may be a direct communication link, such as one formed through a memory read/write interface. In another example, the communication link 606 may be an indirect communication link, such as one formed through a network interface. In such a case, the processing resource 604 may access the non-transitory computer readable medium 602 through a network 608. The network 608 may be a single network or a combination of multiple networks and may use a variety of communication protocols.

The processing resource 604 and the non-transitory computer readable medium 602 may also be communicatively coupled to data sources 610 over the network 608. The data sources 610 may include, for example, databases and computing devices. The data sources 610 may be used by the database administrators and other users to communicate with the processing resource 604.

In one example, the non-transitory computer readable medium 602 may include a set of computer readable instructions, such as a prediction engine 612. As would be understood, the prediction engine 612 implements the functionality of the prediction engine 218. The set of computer readable instructions, referred to as instructions hereinafter, can be accessed by the processing resource 604 through the communication link 606 and subsequently executed to perform acts for facilitating facsimile communication.

For discussion purposes, the execution of the instructions by the processing resource 604 has been described with reference to various components introduced earlier with reference to the description of FIGS. 1-5. On execution by the processing resource 604, the prediction engine 612 may obtain weather data of a geographical location in which a device is located. In one example, the weather data may include values of environmental parameters, such as temperature, humidity, wind conditions, air pressure, atmospheric particulate matter, and salt content. In one example, the weather data may be obtained and shared with the prediction engine 612 from a weather forecast database maintained by a public or a private organization, such as Meteorological Department, or a weather forecasting service.

The prediction engine 612 may further predict a threshold operating temperature range for the device based on a device model of the device, the weather data, and a mapping table. In one example, the mapping table may provide a mapping between the device model, the weather data, and a plurality of operating temperature ranges for the device model.

Further, the prediction engine 612 may share the threshold operating temperature range with the device for initiating a temperature control device connected to the device for device temperature control. In one example, the device may initiate the temperature control device based on the threshold operating temperature range and the current device temperature of the device.

Although examples for the present subject matter have been described in language specific to structural features and/or methods, it should be understood that the appended claims are not limited to the specific features or methods described. Rather, the specific features and methods are disclosed and explained as examples of the present subject matter.

What is claimed is:

1. A device comprising:
a processor;
a weather forecast engine coupled to the processor to:
   obtain weather data of a geographical location in which the device is located, wherein the weather data includes values of environmental parameters; and
   share the weather data with a prediction engine; and
a control engine coupled to the processor to:
   receive, from the prediction engine, a first threshold operating temperature determined for the device based on the weather data, a device model, and a mapping table; and
   initiate a temperature control device, connected to the device, to cool the device, if a current device temperature of the device is greater than the first threshold operating temperature.

2. The device as claimed in claim 1, wherein the control engine is to:
compare the current device temperature with a second threshold operating temperature; and
initiate the temperature control device to heat the device if the current device temperature is less than the second threshold operating temperature.

3. The device as claimed in claim 1, wherein the control engine is to:
obtain an updated current device temperature of the device after initiating the temperature control device; and
stop the temperature control device when the updated current device temperature has a value between the first threshold operating temperature and a second threshold operating temperature.

4. The device as claimed in claim 1, further comprising:
thermal sensors connected to components of the device to sense an individual operating temperature of each of the components; and
a temperature monitoring engine to:
   obtain the individual operating temperature from the thermal sensors; and
   provide the current device temperature based on individual operating parameters of the components, wherein the operating parameters include the individual operating temperature of each of the components.

5. A method comprising:
obtaining a threshold operating temperature range for a device, wherein the threshold operating temperature range is determined based on a device model of the device and weather data of a geographical location in which the device is located, wherein the weather data includes values of environmental parameters;
obtaining a current device temperature of the device;
initiating a temperature control device connected to the device, if the current device temperature is outside the threshold operating temperature range; and
stopping the temperature control device when an updated current device temperature has a value within the threshold operating temperature range.

6. The method as claimed in claim 5, wherein obtaining the current device temperature further comprises:
obtaining individual operating parameters of a plurality of components of the device from thermal sensors, wherein the individual operating parameters include individual operating temperature of a plurality of components, and wherein the individual operating temperature of each of the plurality of components is obtained from corresponding thermal sensors connected to the components;
analyzing the individual operating parameters of each of the plurality of components of the device to obtain the current device temperature.

7. The method as claimed in claim 5, wherein the initiating the temperature control device comprises:
comparing the current device temperature with a first threshold operating temperature and a second threshold operating temperature, wherein the threshold operating temperature range lies between the first threshold operating temperature and the second threshold operating temperature;
initiating the temperature control device to heat the device if the current device temperature is less than the second threshold operating temperature; and
initiating the temperature control device to cool the device if the current device temperature is greater than the first threshold operating temperature.

8. The method as claimed in claim 7, wherein the stopping the temperature control device comprises:
comparing the updated current device temperature with the first threshold operating temperature and the second threshold operating temperature;
stopping the temperature control device from heating the device if the updated current device temperature is greater than the second threshold operating temperature; and
stopping the temperature control device from cooling the device if the updated current device temperature is less than the first threshold operating temperature.

9. The method as claimed in claim 5, wherein obtaining the threshold operating temperature range for the device comprises:
obtaining, by the device, weather data of the geographical location in which the device is located;
sharing, by the device, the weather data with a prediction engine;
predicting, by the prediction engine, a first threshold operating temperature and a second threshold operating temperature for the device based on the device model of the device, the weather data, and a mapping table, wherein the mapping table provides a mapping between the device model, the weather data, and a plurality of operating temperature ranges for the device model;
receiving, from the prediction engine, the first threshold operating temperature and the second threshold operating temperature defining the threshold operating temperature range.

10. The method as claimed in claim 5, the method further comprises:
obtaining, for each of a plurality of geographical locations, historic weather data for a particular time period;
for each of the plurality of geographical locations, obtaining historic device data of each of a plurality of training set devices operating in the geographical location during the particular time period, wherein the historic device data of a training set device, from the plurality of training set devices, includes a device model of the training set device, a list of components of the training set device, current operating temperatures of each component of the training set device, and an operating temperature rating of each component of the training set device; and
analyzing the historic weather data and the historic device data to generate a mapping table indicating a relation between the weather data of the geographical location, the device model, and operating temperature of the device model.

11. The method as claimed in claim 5, the method further comprises:
obtaining, for each of a plurality of geographical locations, historic weather data for a particular time period;
for each of the plurality of geographical locations, obtaining historic device data of each of a plurality of training set devices operating in the geographical locations during the particular time period, wherein the historic device data of a training set device, from the plurality of training set devices, includes a device model of the training set device, a list of components of the training set device, current operating temperature of each component of the training set device, and an operating temperature rating of each component of the training set device;
providing a training set of historic weather data and historic device data, from the historic weather data and the historic device data, to a plurality of machine learning models for training;
providing a testing set of historic weather data and historic device data, from the historic weather data and the historic device data, to each of the plurality of machine learning models for predicting test threshold operating temperatures of the training set devices; and
analyzing the test threshold operating temperatures obtained from each of the plurality of machine learning models to determine a machine learning model to be used for predicting the threshold operating temperature range for the device in a prediction phase.

12. A non-transitory computer readable medium having a set of computer readable instructions that, when executed, cause a processor to:
obtain weather data of a geographical location in which a device is located, wherein the weather data includes values of environmental parameters;
predict a threshold operating temperature range for the device based on a device model of the device, the weather data, and a mapping table, wherein the mapping table provides a mapping between the device model, the weather data, and a plurality of operating temperature ranges for the device model; and
share the threshold operating temperature range with the device for initiating, based on the threshold operating temperature range and a current device temperature of the device, a temperature control device connected to the device for device temperature control.

13. The non-transitory computer readable medium as claimed in claim 12, wherein the set of computer readable instructions, when executed, further cause the processor to:
compare the current device temperature with a first threshold operating temperature and a second threshold operating temperature, wherein the threshold operating temperature range lies between the first threshold operating temperature and the second threshold operating temperature;
initiate the temperature control device to heat the device if the current device temperature is less than the second threshold operating temperature;
initiate the temperature control device to cool the device if the current device temperature is greater than the first threshold operating temperature; and
stop the temperature control device when an updated current device temperature has a value within the threshold operating temperature range.

14. The non-transitory computer readable medium as claimed in claim 13, wherein the set of computer readable instructions, when executed, further cause the processor to:
obtain individual operating parameters of a plurality of components of the device; and
analyze the individual operating parameters of each of the plurality of components of the device to obtain the updated current device temperature.

15. The non-transitory computer readable medium as claimed in claim 12, wherein the set of computer readable instructions, when executed, further cause the processor to:
obtain, for each of a plurality of geographical locations, historic weather data for a particular time period;
for each of the plurality of geographical locations, obtain historic device data of each of a plurality of training set devices operating in the geographical location during the particular time period, wherein the historic device data of a training set device, from the plurality of training set devices, includes a device model of the training set device, a list of components of the training set device, current operating temperatures of each component of the training set device, and an operating temperature rating of each component of the training set device;
provide the historic weather data and the historic device data to a plurality of machine learning models for training;
provide a testing set of historic weather data and the historic device data to each of the plurality of machine learning models for predicting test threshold operating temperatures of the training set devices;
analyze the test threshold operating temperatures obtained from each of the plurality of machine learning models to determine a machine learning model to be used for predicting the threshold operating temperature range for the device in a prediction phase; and
analyze the historic weather data and the historic device data to generate a mapping table indicating a relation between the weather data of the geographical location, the device model, and operating temperature of the device model.

* * * * *